United States Patent
Lang et al.

(10) Patent No.: US 9,973,668 B2
(45) Date of Patent: May 15, 2018

(54) CAMERA SYSTEM HAVING A MODULAR PRINTED CIRCUIT BOARD ARRANGEMENT

(71) Applicants: Werner Lang, Ergersheim (DE); Peter Geissendoerfer, Gallmersgarten (DE); Simon Deffner, Flachslanden (DE); Jens Stuerzenhofecker, Martk Erlbach (DE)

(72) Inventors: Werner Lang, Ergersheim (DE); Peter Geissendoerfer, Gallmersgarten (DE); Simon Deffner, Flachslanden (DE); Jens Stuerzenhofecker, Martk Erlbach (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days. days.

(21) Appl. No.: 14/974,131

(22) Filed: Dec. 18, 2015

(65) Prior Publication Data
US 2016/0182784 A1     Jun. 23, 2016

(30) Foreign Application Priority Data
Dec. 18, 2014   (DE) .................. 10 2014 019 007

(51) Int. Cl.
*H04N 5/225*      (2006.01)
*G03B 17/02*      (2006.01)

(52) U.S. Cl.
CPC ........... *H04N 5/2254* (2013.01); *G03B 17/02* (2013.01); *H04N 5/2251* (2013.01);
(Continued)

(58) Field of Classification Search
None
See application file for complete search history.

(56) References Cited

U.S. PATENT DOCUMENTS

| 8,959,397 B2 * | 2/2015 | Tsai ................. G06F 11/2294 714/27 |
| 2004/0060032 A1 * | 3/2004 | McCubbrey ........ G06F 17/5054 716/104 |

(Continued)

FOREIGN PATENT DOCUMENTS

| CA | 2 850 992 | 4/2013 |
| CN | 102334066 | 1/2012 |

(Continued)

OTHER PUBLICATIONS

Vescent Photonics Product Manuals, OEM Integration Guide, Jul. 30, 2014.*

(Continued)

*Primary Examiner* — James Hannett
(74) *Attorney, Agent, or Firm* — Cozen O'Connor

(57) ABSTRACT

Camera system for a vehicle comprising an objective lens; a first printed circuit board provided with an image sensor for acquiring image information via the objective lens; and at least one additional printed circuit board adapted for providing a predetermined basic function for the camera system, wherein the first printed circuit board and each of the at least one additional printed circuit board comprises at least a connection unit, wherein the printed circuit boards are electrically connectable in a modular exchangeable manner, respectively, via the at least one connection unit for adapting the range of functions of the camera system according to the predetermined basic function.

10 Claims, 2 Drawing Sheets

(52) U.S. Cl.
CPC ......... *H04N 5/2253* (2013.01); *H04N 5/2257* (2013.01); *G03B 2217/002* (2013.01)

(56) References Cited

U.S. PATENT DOCUMENTS

| | | |
|---|---|---|
| 2005/0099521 A1 | 5/2005 | Bleau et al. |
| 2005/0099769 A1 | 5/2005 | Bleau et al. |
| 2005/0289274 A1* | 12/2005 | Ghercioiu ................ G06F 8/51 710/303 |
| 2010/0165188 A1 | 7/2010 | Jannard |
| 2015/0296104 A1 | 10/2015 | Jannard |

FOREIGN PATENT DOCUMENTS

| | | |
|---|---|---|
| DE | 94 00 442 | 3/1994 |
| DE | 199 63 836 A1 | 7/2007 |
| DE | 10 2011 084 200 | 4/2013 |
| JP | 05-284396 | 10/1993 |
| JP | 2001-076124 | 3/2001 |
| JP | 2003-007373 | 1/2003 |
| JP | 2007-115582 | 5/2007 |
| KR | 20110102896 | 9/2011 |
| WO | WO 93/03575 | 2/1993 |
| WO | WO 00/46984 A1 | 8/2000 |
| WO | WO 2007/036308 A1 | 5/2007 |

OTHER PUBLICATIONS

Office Action dated Feb. 14, 2017 which issued in the corresponding Japanese Patent Application No. 2015-246056.
Office Action dated Aug. 22, 2017 which issued in the corresponding Japanese Patent Application No. 2015-246056.
Office Action dated Nov. 17, 2017 which issued in the corresponding Chinese Patent Application No. 201510957631.7.

* cited by examiner

CAMERA SYSTEM HAVING A MODULAR PRINTED CIRCUIT BOARD ARRANGEMENT

BACKGROUND OF THE INVENTION

1. Field of the Invention

The invention relates to a camera system having a modular printed circuit board arrangement, for example, for use in vehicles, for example, commercial vehicles.

2. Description of the Related Art

Commonly known camera systems usually comprise stacked printed circuit boards having a predetermined circuit board layout. For changing basic functions of a camera, for example image acquisition, image processing, signal transmission and electrical connections as well as possible additional functions, in conventional camera systems it is necessary to change the entire circuit board layout for exchanging, adding or omitting, respectively, individually required functions. Such changing of the entire circuit board layout is complex and expensive.

WO 00/46984 A1 relates to the way of constructing and mounting an intelligent camera including electronic configuration.

WO 2007/036308 A1 relates to an electrical imaging system with separated modules, in particular having the possibility to flexibly exchange a plurality of interface modules by using a common bus system.

DE 199 63 836 A1 relates to an electrical camera having a light sensitive sensor chip provided on a first printed circuit board and having at least a control circuit for driving the sensor chip.

US 2005/0099521 A1 relates to a camera for optical imaging in the wide angle range.

SUMMARY OF THE INVENTION

An object of the present invention is to provide a camera system capable of quickly and cost efficiently adapting new camera versions having an individually range of functions of the camera adapted to customer requirements.

A solution of the above object is given by a camera system according to the features of claim 1. Advantageous further developments of the invention are given in the dependent claims.

The camera system according to the present invention is based on a modular system having components of a defined family of parts for a camera.

The camera system according to the present invention comprises an objective lens for supplying image information to an image sensor disposed on a first printed circuit board. Therefore, the first printed circuit board has the basic function of acquiring image data obtained by the objective lens. Further, the camera system according to the present invention comprises at least one additional printed circuit board providing a predetermined additional function for the camera system, as for example image processing, signal conversion, radio transmission, power supply, image transmission, signal transmission, heating control, measurement value transfer, audio recording, etc.

According to the present invention the above mentioned first printed circuit board and each of the at least one additional printed circuit boards comprise at least a connection unit used for electrical connecting the respective printed circuit boards to each other in a modular exchangeable way for adapting the range of functions of the camera systems.

By such a modular printed circuit board arrangement is possible to provide new camera versions with less development costs and expenses and to adapt the range of functions of the camera system to individual customer requirement. In particular, it is possible to incorporate and omit, respectively, required and respectively not required functions/printed circuit boards in the camera system depending on the requirements of a customer.

By using a standardized family of parts for the camera system it is in addition possible to reduce risk of malfunctions as well as manufacturing costs of the camera system.

Preferably, the individual connection units of the printed circuit boards according to the camera system of the present invention are arranged at predetermined positions geometrically compatible to each other on at least a surface of the printed circuit board. The arrangement of each connection unit can, for example, be on a surface side of the printed circuit board or alternatively on two opposing surface sides of the printed circuit board, i.e. on a front side and a rear side of the printed circuit board.

A camera system according to the invention preferably comprises at least one connection unit for a printed circuit board comprising a plurality of groups of electrical connections through which the printed circuit board is connectable to other printed circuit boards for providing a predetermined basic function for the camera system.

In particular, via a group of electrical connections of the connection unit of the first printed circuit board, the first printed circuit board as a sensor circuit board on which the image sensor is provided, is connectable to an additional printed circuit board providing for example an image processing function for a camera system. Further, via a group of electrical connections of the connection unit of the additional printed circuit board, the additional printed circuit board providing the image processing function for the camera system is preferably connectable to a still additional printed circuit board providing for example a power supply function for the camera system.

For ensuring a quick and reliable extension of the range of functions of the camera system, the electrical connections of a corresponding group of electrical connections are located at predetermined positions.

According to the camera system of the present invention the plurality of groups of electrical connections is preferably arranged side by side (next to each other) in series, in particular plural connection units each comprising the plurality of groups of electrical connections are provided for each printed circuit board. These connection units are for example located on a surface side of a printed circuit board, or alternatively on a front side and a back side thereof, such that they geometrically oppose each other.

With the camera system according to the present invention plural printed circuit boards are preferably arranged one after another such that the first printed circuit board is arranged at the objective lens of the camera system, and the additional circuit boards for providing respective functions of the camera system are arranged one after another on a side of the first printed circuit board opposite to the side of the objective lens. Preferably, the last printed circuit board in this arrangement comprises an electrical connection suitable for transferring a video signal, audio signal and/or control signal to the exterior, or for inputting into the camera system via this electrical connection. Such an electrical connection can also be provided on one or more of the other printed circuit boards.

According to the present invention appropriate electronic components and elements, respectively, are provided on the corresponding printed circuit board, adapted for providing the corresponding basic functions for adapting the camera system. Such predetermined basic functions for adapting the camera system according to the present invention are for example video processing, video transmission, signal conversion, radio transmission, power supply, signal transmission, heating control, measurement value hand over, audio recording, etc.

For fast and reliable configuration of the camera system according to the present invention, the respective connection units of the printed circuit boards are for example provided as plug connections for electrically connecting the printed circuit boards to each other via the electrical connections of the respective groups of electrical connections. Other connecting techniques can be used, for example cable, soldering, radio, etc.

The camera system according to the present invention can for example be used in mirror substitution systems for vehicles, in particular commercial vehicles for continuously and permanently providing image information of the environment of the vehicle in real time on a display device provided within and/or outside of the vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following preferred embodiments of the invention are described by reference to the enclosed figures, wherein same reference signs indicate same parts.

DETAILED DESCRIPTION OF THE PRESENTLY PREFERRED EMBODIMENTS

Figure 1:
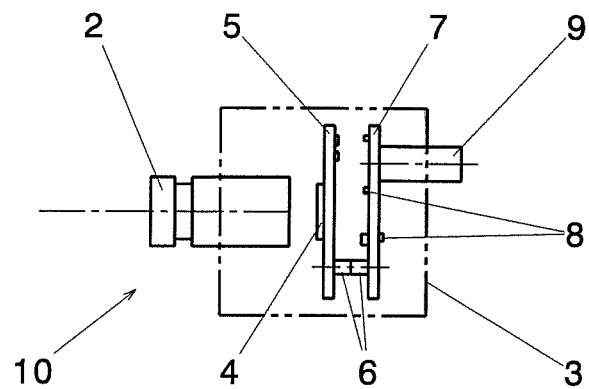
FIG. 1 shows a schematic cross-sectional view of a camera system according to a first embodiment of the invention.

FIG. 1 shows a schematic cross-sectional view of a camera system 10 according to a first embodiment. The camera system 1 comprises an objective lens 2, which is arranged within a housing 3 of the camera system 10 such that image information from outside the camera system 10 can be supplied to the interior of the housing 3.

In particular, the objective lens 2 supplies image information from outside of the camera system to an image sensor 4 provided on a first printed circuit board 5 disposed within the housing 3 and positioned such that the image sensor 4 directly opposes the objective lens 2.

As shown in FIG. 1, the first printed circuit board 5 is electrically connected to an additional printed circuit board 7 via a connection unit 6. As shown in FIG. 1, the connection unit 6 of the first printed circuit board 5 is in particular arranged at a lower area of the first printed circuit board 5 on a surface side opposite to the side of the objective lens 2. Further, a connection unit 6 is arranged at a lower area of the additional printed circuit board 7 on a surface such that the connection unit 6 directly opposes the first printed circuit board, so as to be electrically connected therewith.

As shown in FIG. 1, the first printed circuit board 5 as well as the additional printed circuit board 7 comprise a connection unit 6 adapted such that they provide an electrical connection between the first printed circuit board and the additional printed circuit board 7 according to a plug connection, for example.

According to the first embodiment, the first printed circuit board 5 is a sensor circuit board on which an image sensor 4 is arranged, as mentioned above. The additional printed circuit board 7 has for example the function of power supply of the camera system 10. For this corresponding electronic components 8, as shown in FIG. 1, are arranged on the additional circuit board 7 which provides the corresponding power supply function for the camera system 10.

Alternatively, respective electronic components 8 providing the power supply function for the camera system 10 can also be disposed on the first printed circuit board 5. In this case the additional printed circuit board 7 can, for example, comprise components 8 providing the function of signal conversion for converting a signal output from the image sensor 4 of the first printed circuit board 7 and for supplying to the exterior of the camera system via an electric connection 9, as shown in FIG. 1. The electric connection 9, as shown in FIG. 1, can for example be also used for delivering respective control signals to the electronic components 8 of the additional printed circuit board 7 or to the electronic components 8 of the first printed circuit board 5.

As shown in FIG. 1, the first printed circuit board 5 is arranged in parallel to the additional circuit board 7, wherein the respective connection units 6 of the first printed circuit board 5 and the additional printed circuit board 7 substantially extend orthogonal from a surface of the first printed circuit board 5 and the additional printed circuit board 7, respectively. In particular, in a state where the first printed circuit board 5 and the additional printed circuit board 7 are electrically connected to each other via the connection units 6, a longitudinal axis of the connection units 6 is parallel to a longitudinal axis of the housing 3 of the camera system 10.

As mentioned above, exactly two printed circuit boards 5, 7 are provided in the first embodiment, which are electrically connected to each other via respective connection units 6. However, an arbitrary number of additional printed circuit boards can be arranged therebetween such that the printed circuit boards are electrically connected to each other via their respective connection units, as described below with reference to a second embodiment.

Figure 2:
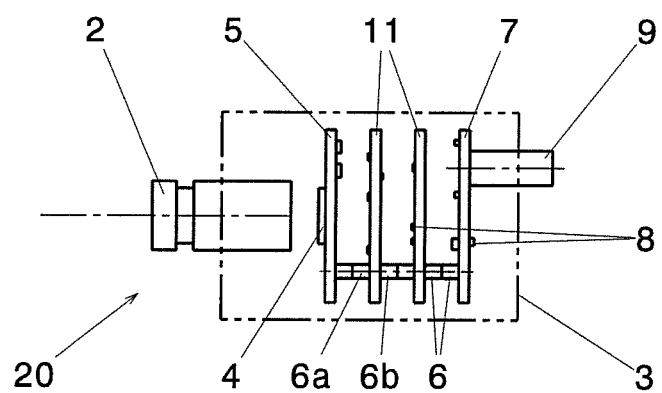
FIG. 2 shows a schematic cross-sectional view of a camera system according to a second embodiment of the invention.

FIG. 2 shows a schematic cross-sectional view of a camera system 20 according to a second embodiment of the present invention.

In addition to the camera system 10 according to the first embodiment, the camera system 20 according to the second embodiment comprises additional printed circuit boards 11. In contrast to the first printed circuit board 5 and the additional printed circuit board 7 according to the first embodiment, the additional circuit boards 11 comprise two connection units 6 at a lower area thereof extending from opposite surfaces of the additional printed circuit board 11 in opposite directions.

As shown in FIG. 2, in particular the connection unit 6a of the additional printed circuit board 11 extends from a surface of the printed circuit board 11 in a direction away from the first printed circuit board 5 and is adapted for connection with the connection unit of the first printed circuit board 5.

Further, a second connection unit 6b of the additional printed circuit board 11 is formed such that it extends in opposite direction of the connection unit 6a from the additional printed circuit board 11 away for being connected to a connection unit of an additional printed circuit board 11.

The additional printed circuit boards 11 shown in FIG. 2 are adapted for providing further functions and basic functions, respectively, for the camera system, for example, an image processing, radio transmission, image transmission, signal transmission, heating control, measurement value transfer, audio recording, etc.

FIG. 2 specifically shows for printed circuit boards 5, 11 and 7 within the camera housing 3 of the camera system 2 arranged such that they extend parallel to each other such that they are arranged one after another with respect to the length direction of the housing 3. In particular, the printed circuit boards 5, 7 and 11 extend substantially orthogonal to the length axis of the camera housing 3.

Similar to the additional printed circuit board 7 of the first embodiment, the printed circuit boards 11 according to the second embodiment also comprise electrical components 8 for providing corresponding functions and basic functions, respectively, for expanding the range of functions of the camera system 20 according the basic function.

As shown in FIG. 2, the corresponding connection units 6, 6a, 6b of the printed circuit boards 5, 7 and 11 extend along an axis which is substantially parallel to the longitudinal direction of the camera housing 3 and parallel to the longitudinal axis of the objective lens 2, respectively.

Figure 3:
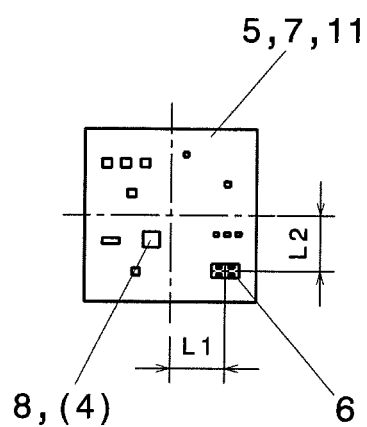
FIG. 3 shows a schematic plan view of a printed circuit board according to the first and second embodiments.

In particular, the corresponding connection units of the printed circuit boards 5, 7 and 11 are arranged at geometrical compatible predetermined positions (L1, L2) to each other on at least a surface side of a printed circuit board, as for example shown in FIG. 3.

FIG. 3 shows one of the printed circuit boards 5, 7, 11 according to the first and second embodiments, as described above. As shown in FIG. 3, the connection unit 6 is located at predetermined geometrical position (L1, L2) which is identical for all additional printed circuit boards 5, 7, 11.

According to the first and second embodiments, as described above, the connection unit 6 is only provided on a surface side of the first printed circuit board 5 (sensor plate) and the additional printed circuit board 7, wherein connection units 6 (6a, 6b) of the additional printed circuit boards 11, as shown in FIG. 2, are also provided on an opposite surface (not shown in FIG. 3) at the position (L1, L2) for electrically connecting the respective printed circuit boards 5, 7 and 11 in a modular exchangeable manner.

Figure 4:
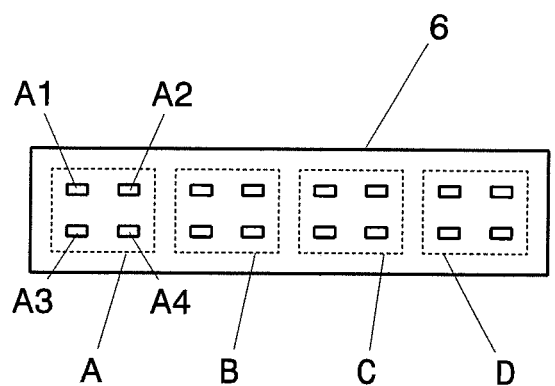
FIG. 4 shows a schematic view of a connection unit according to the first and second embodiment.

FIG. 4 shows a detailed view of the connection unit 6. As shown in FIG. 4, the connection unit 6 according to the present embodiments comprises for groups for electrical connections A, B, C, D, which in turn comprise corresponding electrical connections (terminals) A1, A2, A3, A4.

According to the present embodiments, the groups of electric connections A, B, C are adapted for providing a connection of the printed circuit boards providing a camera system's specific basic function, for example, image acquisition, signal conversion, radio transmission, power supply, image processing, image transmission, signal transmission, measurement value handover, audio recording, etc. The group of electrical connections D of the connection unit 6 as shown in FIG. 4, is for example adapted for providing an additional function, for example heating control.

As shown in FIG. 4, the groups of electrical connections A, B, C, D according to the preferred embodiment, are arranged one after another, respectively, next to each other. Alternatively, it is also possible to arrange the groups of electrical connections A, B, C, D in an arbitrary geometric arrangement, provided this specific geometric arrangement is identical for all additional printed circuit boards which shall be mounted in the camera system in a modular exchangeable manner.

As shown in FIG. 4, the group of electrical connections A comprises four electrical connections (terminals) A1, A2, A3 and A4 which are arranged at predetermined geometric locations and for example are required for a basic function, for example mass, power supply, voltage etc. Other geometric arrangements of the electrical connections A1, A2, A3, A4 and a number thereof are possible according to the present invention.

The above described camera system according to the present invention can be used alone or for example in a vehicle or, for example in a mirror substitution system for vehicles, for example commercial vehicles.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A camera system for a vehicle, comprising
an objective lens;
a first printed circuit board provided with an image sensor for acquiring image information obtained via the objective lens; and
an additional printed circuit board adapted for providing a predetermined basic function for the camera system;
wherein at least one further additional printed circuit board is provided between the first printed circuit board and the additional printed circuit board and is adapted for providing a predetermined camera specific basic function for the camera system; and
wherein each of the printed circuit boards comprises at least one connection unit adapted for electrically connecting the printed circuit boards to each other in a modular exchangeable manner for adapting the range of functions of the camera system according to the predetermined camera specific basic function,
wherein each of the connection units comprises a plurality of groups of electrical connections, wherein the first printed circuit board is connectable with both of the at least one additional printed circuit board and the additional printed circuit board via the plurality of groups of electrical connections for providing the predetermined camera specific basic function for the camera system; and wherein a respective group of electrical connections comprises a plurality of electrical terminals located at predefined positions and required for a basic function for operating each of the at least one further additional printed circuit boards, for providing the predetermined camera specific basic function, wherein the respective connection units of the first printed circuit board, at least one further additional printed circuit board and the additional printed circuit board are arranged at predetermined positions geometrically compatible to each other on at least a surface side of the first printed circuit board, the least one further additional printed circuit board and the additional printed circuit hoard.

2. The camera system according to claim 1, wherein the printed circuit boards are connectable to each other via a plurality of electrical terminals.

3. The camera system according to claim 1, wherein the electrical terminals of a respective group of electrical connections are located at predefined positions.

4. The camera system according to claim 1, wherein plural connection units are provided for each printed circuit board.

5. The camera system according to claim 1, wherein the at least one additional printed circuit board comprises an electrical connection for transmitting data and/or a signal to the exterior of the camera system.

6. The camera system according to claim 1, wherein the at least one additional printed circuit board is arranged on a side of the first printed circuit board, which is opposite to the side of the objective lens.

7. The camera system according to claim 6, wherein a plurality of additional printed circuit boards are arranged one after another with respect to the first printed circuit board.

8. The camera system according to claim 1, wherein the at least one additional printed circuit boards comprises at least one electrical component adapted for providing the predetermined additional function for expanding the camera system.

9. The camera system according to claim 1, wherein the predetermined additional function for expanding the camera system is at least one of signal acquisition, signal processing, signal transmission, power supply and control function.

10. The camera system according to claim 1, wherein the at least one connection unit of the printed circuit boards is a plug connection for electrically connecting the printed circuit boards to each other via the electrical terminals of the groups of electrical connections.

\* \* \* \* \*